US012482433B2

(12) United States Patent
Li et al.

(10) Patent No.: US 12,482,433 B2
(45) Date of Patent: Nov. 25, 2025

(54) DRIVE METHOD AND DRIVE CIRCUIT OF DISPLAY PANEL, AND DISPLAY DEVICE

(71) Applicant: HKC Corporation Limited, Guangdong (CN)

(72) Inventors: Zeyao Li, Guangdong (CN); Lidan Ye, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/751,311

(22) Filed: Jun. 23, 2024

(65) Prior Publication Data

US 2025/0029569 A1 Jan. 23, 2025

(30) Foreign Application Priority Data

Jul. 18, 2023 (CN) ......................... 202310880726.8

(51) Int. Cl.
*G09G 3/34* (2006.01)
*G09G 3/36* (2006.01)

(52) U.S. Cl.
CPC ......... *G09G 3/3406* (2013.01); *G09G 3/3607* (2013.01); *G09G 3/3648* (2013.01); *G09G 2300/0852* (2013.01); *G09G 2310/08* (2013.01)

(58) Field of Classification Search
CPC ......... G09G 2320/0252; G09G 3/3648; G09G 2340/16; G09G 5/14
See application file for complete search history.

(56) References Cited

U.S. PATENT DOCUMENTS

| | | | | |
|---|---|---|---|---|
| 8,587,579 B2 * | 11/2013 | Huangfu | G02F 1/136213 345/211 |
| 2015/0371594 A1 * | 12/2015 | Huang | G09G 3/003 345/102 |
| 2017/0102589 A1 * | 4/2017 | Yang | G02F 1/133621 |
| 2017/0178585 A1 * | 6/2017 | Chang | G09G 3/3648 |
| 2023/0237969 A1 * | 7/2023 | Hsiao | G09G 3/3413 345/55 |

FOREIGN PATENT DOCUMENTS

| | | | |
|---|---|---|---|
| CN | 1905685 | A | 1/2007 |
| CN | 101154356 | A | 4/2008 |
| CN | 101471043 | A | 7/2009 |
| CN | 101614919 | A | 12/2009 |
| CN | 102023434 | A | 4/2011 |
| CN | 104036748 | A | 9/2014 |
| CN | 105137656 | A | 12/2015 |
| CN | 114822427 | A | 7/2022 |
| JP | 2003108084 | A | 4/2003 |
| JP | 2006220685 | A | 8/2006 |
| JP | 2008191686 | A | 8/2008 |
| WO | 2007055454 | A1 | 5/2007 |

* cited by examiner

*Primary Examiner* — Van N Chow

(57) ABSTRACT

The present application relates to the field of a display technology, and provides a drive method and a drive circuit of a display panel, and a display device; the display panel includes a plurality of pixel units, each of the plurality of pixel units corresponds to a storage capacitor and a liquid crystal capacitor; a time required for displaying each frame image through the display panel includes a first sub-field sequence, a second sub-field sequence, and a third sub-field sequence in sequence, and each sub-field sequence comprises a data writing period and a backlight luminescent period in sequence.

16 Claims, 7 Drawing Sheets

DRIVE METHOD AND DRIVE CIRCUIT OF DISPLAY PANEL, AND DISPLAY DEVICE

CROSS REFERENCE TO RELATED APPLICATION

This application claims foreign priority benefits to Chinese Patent Application No. 202310880726.8 filed Jul. 18, 2023. The contents of all of the aforementioned applications, including any intervening amendments thereto, are incorporated herein by reference.

TECHNICAL FIELD

The present application relates to the field of a display technology, and more particularly to a drive method and a drive circuit of a display panel, and a display device.

BACKGROUND

Color field sequence display is a display mode of a display device for realizing color display. The principle of color field sequence display is as follows: an image frame to be displayed is divided into a plurality of monochromatic color component plots according to color, and a display time of one frame is divided into a plurality of sub-field sequences corresponding to the color component plots. The color component plots are displayed in the corresponding sub-field sequences, and the plurality of color component plots are quickly switched within the display time of one frame, and color superposition in time is realized by using the visual retention effect of human eyes. Thus, color display is achieved.

In the sub-field sequences, the pixel drive data corresponding to the color component plots are written into the liquid crystal display panel. After the pixel driver data is written, the liquid crystal in the liquid crystal display panel is driven and moves to the position corresponding to the color component plots. Then, the backlight module is controlled to turn on the backlight corresponding to the sub-field sequences to realize displaying of the color component plots in the corresponding field sequence.

However, the writing process of the pixel drive data will cause the time of turning on of the backlight of the display panel to be shortened, thus the overall display brightness and gamut will be affected. In addition, because the sub-field sequence frequency of the field sequence liquid crystal display is several times of the refresh frequency, thus when the color field sequence display mode is applied to the high frequency liquid crystal display, the time of sub-field sequence of a frame is very short, which results in insufficient writing time of pixel driver data.

SUMMARY

In view of this, embodiments of the present application provide a drive method and a drive circuit of a display panel, and a display device, in order to solve the technical problem of insufficient writing time of pixel driver data due to very short of time of the sub-field sequence when the color field sequence display mode is applied to the high-frequency liquid crystal display, in the process of field sequence display.

In order to solve above technical problem, in a first aspect, a drive method of a display panel is provided;

the display panel includes a plurality of pixel units, each of the plurality of pixel units corresponds to a storage capacitor and a liquid crystal capacitor; a time required for displaying each frame image through the display panel includes a first sub-field sequence, a second sub-field sequence, and a third sub-field sequence in sequence, and each sub-field sequence includes a data writing period and a backlight luminescent period in sequence; a pixel driver data required by the first sub-field sequence is a first display data, and the first display data includes a first data and a second data; a pixel driver data required by the second sub-field sequence is a second display data, and the second display data includes a third data and a fourth data; and a pixel driver data required by the third sub-field sequence is a third display data, and the third display data includes a fifth data and a sixth data;

correspondingly, the drive method includes:

writing a first data and a second data obtained by the storage capacitor into the liquid crystal capacitor during an operating period of a previous frame image during a data writing period of a first sub-field sequence of a current frame image;

temporarily storing a fourth data required by the second sub-field sequence and a fifth data required by the third sub-field sequence into the storage capacitor during a backlight luminescent period of the first sub-field sequence of the current frame image; and providing a backlight to the display panel;

writing the third data obtained during the operating period of the previous frame image and the fourth data in the storage capacitor into the liquid crystal capacitor during a data writing period of a second sub-field sequence of the current frame image;

temporarily storing a sixth data required by the third sub-field sequence and a first data required by a next frame image into the storage capacitor during a backlight luminescent period of the second sub-field sequence of the current frame image; and providing a backlight to the display panel;

writing the fifth data and the sixth data in the storage capacitor into the liquid crystal capacitor during the data writing period of the third sub-field sequence of the current frame image; and temporarily storing a second data and a third data required by a next frame image into the storage capacitor during a backlight luminescent period of the third sub-field sequence of the current frame image, and providing a backlight to the display panel.

The present application has the following beneficial effects: the present application temporarily stores the pixel driver data of a sub-field sequence into a storage capacitor in two times, and the time period of each temporary storage into the storage capacitor overlaps the backlight luminescent period of the previous two sub-field sequences of the sub-field sequence, and finally, the pixel driver data written twice in the storage capacitor is written into the liquid crystal capacitor in the sub-field sequence, the data writing time is increased, and the problem of insufficient charging of high frequency liquid crystal display pixel is solved.

In an example of the first aspect, the storage capacitor includes a first storage capacitor and a second storage capacitor;

said temporarily storing the fourth data required by the second sub-field sequence and the fifth data required by the third sub-field sequence into the storage capacitor during the backlight luminescent period of the first sub-field sequence of the current frame image includes:

temporarily storing the fourth data required by the second sub-field sequence into the second storage capacitor, and temporarily storing the fifth data required by the third sub-field sequence into the first storage capacitor during the backlight luminescent period of the first sub-field sequence of the current frame image;

said temporarily storing the sixth data required by the third sub-field sequence and the first data required by the next frame image into the storage capacitor during the backlight luminescent period of the second sub-field sequence of the current frame image includes:

temporarily storing the sixth data required by the third sub-field sequence into the first storage capacitor, and temporarily storing the first data required by the next frame image into the second storage capacitor during the backlight luminescent period of the second sub-field sequence of the current frame image; and said temporarily storing the second data and the third data required by the next frame image into the storage capacitor during the backlight luminescent period of the third sub-field sequence of the current frame image includes:

temporarily storing the third data required by the next frame image to the first storage capacitor, and temporarily storing the second data required by the next frame image into the second storage capacitor during the backlight luminescent period of the third sub-field sequence of the current frame image.

In the example, the pixel driver data of a sub-field sequence is temporarily stored twice to different storage capacitors, which can improve the working efficiency of the pixel driver data of the display panel. Finally, part of the pixel driver data of different storage capacitors are respectively written into the liquid crystal capacitor in the sub-field sequence, thus the data writing time is increased.

In an example of the first aspect, said writing the first data and the second data obtained by the storage capacitor during the operating period of the previous frame image into the liquid crystal capacitor during the data writing period of the first sub-field sequence of the current frame image includes:

writing a first data and a second data obtained by the second storage capacitor during the operating period of the previous frame image into the liquid crystal capacitor during the data writing period of the first sub-field sequence of the current frame image;

said writing the third data obtained during the operating period of the previous frame image and the fourth data in the storage capacitor into the liquid crystal capacitor during the data writing period of the second sub-field sequence of the current frame image includes:

writing the third data obtained by the first storage capacitor during the operating period of the previous frame image into the liquid crystal capacitor, and writing the fourth data in the second storage capacitor into the liquid crystal capacitor during the data writing period of the second sub-field sequence of the current frame image; and said writing the fifth data and the sixth data in the storage capacitor into the liquid crystal capacitor during the data writing period of the third sub-field sequence of the current frame image includes:

writing the fifth data and the sixth data in the first storage capacitor into the liquid crystal capacitor during the data writing period of the third sub-field sequence of the current frame image.

In an example of the first aspect, each sub-field sequence further includes a liquid crystal flipping period, and the liquid crystal flipping period is located between the data writing period and the backlight luminescent period, and the drive method further includes:

driving a liquid crystal molecule corresponding to the liquid crystal capacitor to flip during the liquid crystal flipping period of the first sub-field sequence of the current frame image, to enable a pixel electrode of a pixel unit of the display panel to be maintained at a gray level voltage corresponding to the first display data;

driving a liquid crystal molecule corresponding to the liquid crystal capacitor to flip during the liquid crystal flipping period of the second sub-field sequence of the current frame image, to enable a pixel electrode of a pixel unit of the display panel to be maintained at a gray level voltage corresponding to the second display data; and driving a liquid crystal molecule corresponding to the liquid crystal capacitor to flip during the liquid crystal flipping period of the third sub-field sequence of the current frame image, to enable a pixel electrode of a pixel unit of the display panel to be maintained at a gray level voltage corresponding to the third display data.

In an example of the first aspect, the drive method further includes:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the first sub-field sequence of the current frame image in the liquid crystal capacitor during the data writing period of the third sub-field sequence of the current frame image.

In the example, the pixel driver data that has completed the monochrome image display in the liquid crystal capacitor is erased at a first time, which can better prepare for the overall writing of the pixel driver data in the next sub-field sequence.

In order to solve above technical problem, in a second aspect, the present application provides a drive circuit of a display panel, which includes:

a liquid crystal capacitor;

a first storage capacitor;

a second storage capacitor;

a first thin film transistor, in which, a controlled end of the first thin film transistor is configured to be accessible by a gate scan signal, an input end of the first thin film transistor is configured to be accessible by a first source signal, and an output end of the first thin film transistor is connected to the first storage capacitor;

a second thin film transistor, in which, a controlled end of the second thin film transistor is configured to be accessible by a first data writing signal, an input end of the second thin film transistor is connected with the first storage capacitor, and an output end of the second thin film transistor is connected with the liquid crystal capacitor;

a fourth thin film transistor, in which, a controlled end of the fourth thin film transistor is configured to be accessible by a second data writing signal, an input end of the fourth thin film transistor is connected with the second storage capacitor, and an output end of the fourth thin film transistor is connected with the liquid crystal capacitor; and a fifth thin film transistor, in which, a controlled end of the fifth thin film transistor is configured to be accessible by the gate scan signal, an input end of the fifth thin film transistor is connected to a second source signal, and an output end of the fifth thin film transistor is connected to the second storage capacitor.

In an example of the second aspect, the drive circuit further includes:

a third thin film transistor, in which, a controlled end of the third thin film transistor is configured to be accessible by a data erasing signal, an input end of the third thin film transistor is connected with the liquid crystal capacitor, and an output end of the third thin film transistor is connected with a common electrode of the display panel.

In an example of the second aspect, the display panel includes a plurality of pixel units, each of the plurality of pixel units corresponds to the first thin film transistor, the second thin film transistor, the fourth thin film transistor, and the fifth thin film transistor, respectively;

a time required for displaying each frame image through the display panel includes a first sub-field sequence, a second sub-field sequence, and a third sub-field sequence in sequence, and each sub-field sequence includes a data writing period and a backlight luminescent period in sequence; in which a pixel driver data required by the first sub-field sequence is a first display data, and the first display data includes a first data and a second data; a pixel driver data required by the second sub-field sequence is a second display data, and the second display data includes a third data and a fourth data; and a pixel driver data required by the third sub-field sequence is a third display data, and the third display data includes a fifth data and a sixth data;

a controller corresponding to the display panel is configured for:

sending a second data writing signal to the controlled end of the fourth thin film transistor during a data writing period of the first sub-field sequence of the current frame image, to write a first data and a second data obtained by the second storage capacitor into the liquid crystal capacitor during an operating period of a previous frame image;

sending a gate scan signal to the controlled end of the first thin film transistor during a backlight luminescent period of the first sub-field sequence of the current frame image, to enable the first thin film transistor receiving a first source signal to determine a fifth data required by the third sub-field sequence, and temporarily store the fifth data required by the third sub-field sequence into the first storage capacitor; sending a gate scan signal to the controlled end of the fifth thin film transistor, to enable the fifth thin film transistor receiving a second source signal to determine a fourth data required by the second sub-field sequence, and temporarily storing the fourth data required by the second sub-field sequence into the second storage capacitor;

sending a first data writing signal to the controlled end of the second thin film transistor during a data writing period of the second sub-field sequence of the current frame image, to write a third data obtained by the first storage capacitor during the operating period of the previous frame image into the liquid crystal capacitor; and sending a second data writing signal to the controlled end of the fourth thin film transistor to write the fourth data in the second storage capacitor into the liquid crystal capacitor;

sending the gate scan signal to the controlled end of the first thin film transistor during a backlight luminescent period of the second sub-field sequence of the current frame image, to enable the first thin film transistor receiving the first source signal to determine a sixth data required by the third sub-field sequence, and temporarily store the sixth data required by the third sub-field sequence into the first storage capacitor; and sending the gate scan signal to the controlled end of the fifth thin film transistor, to enable the fifth thin film transistor receiving the second source signal to determine a first data required by a next frame image, and temporarily storing the first data required by the next frame image into the second storage capacitor;

sending the first data writing signal to the controlled end of the second thin film transistor during a data writing period of the third sub-field sequence of the current frame image, to write the fifth data and the sixth data in the first storage capacitor into the liquid crystal capacitor;

sending the gate scan signal to the controlled end of the first thin film transistor during a backlight luminescent period of the third sub-field sequence of the current frame image, to enable the first thin film transistor receiving the first source signal to determine a third data required by the next frame image, and temporarily storing the third data required by the next frame image to the first storage capacitor; and sending the gate scan signal to the controlled end of the fifth thin film transistor, to enable the fifth thin film transistor receiving the second source signal to determine a second data required by the next frame image, and temporarily storing the second data required by the next frame image into the second storage capacitor; and temporarily storing the second data required by the next frame image into the storage capacitor, and providing a backlight to the display panel.

In an example of the second aspect, each pixel unit is further corresponding to the third thin film transistor; and the controller corresponding to the display panel is further configured for:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the first sub-field sequence of the current frame image in the liquid crystal capacitor during the data writing period of the third sub-field sequence of the current frame image.

In order to solve the technical problem, in a third aspect, the present application further provides a display device, which includes a display panel, a memory, a controller, and a computer program stored in the memory and capable of running on the controller; in which when the computer program is executed by the controller, the steps of the drive method mentioned above are implemented.

It is understandable that the beneficial effects of the second and third aspects mentioned above can be referred to the relevant descriptions in the first aspect above, which will not be repeated here.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
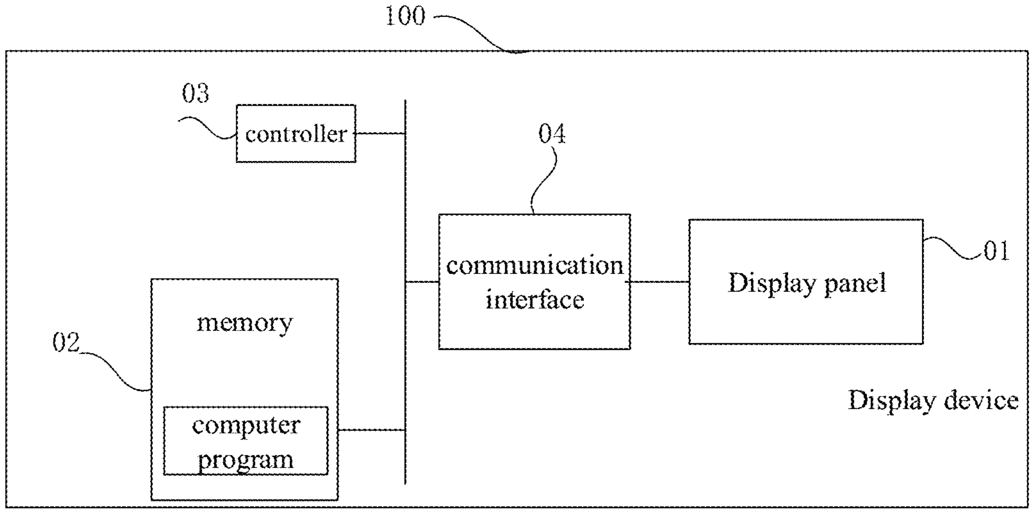
FIG. 1 is a structural schematic diagram of a display device provided in Embodiment 1 of the present application.

In the drawings, the reference signs are listed:

the description of reference signs in FIG. 1:

01—display panel; 02—memory; 03—controller; 04—communication interface.

Figure 5:
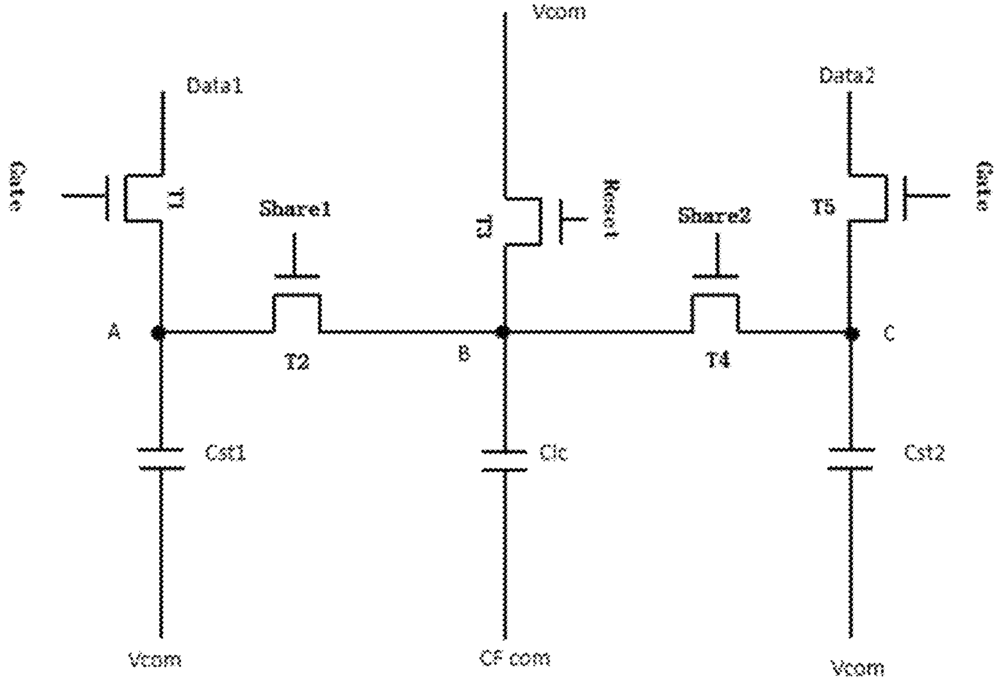
FIG. 5 is a schematic diagram of a drive circuit of a display panel provided in Embodiment 3 of the present application.
Figure 6:
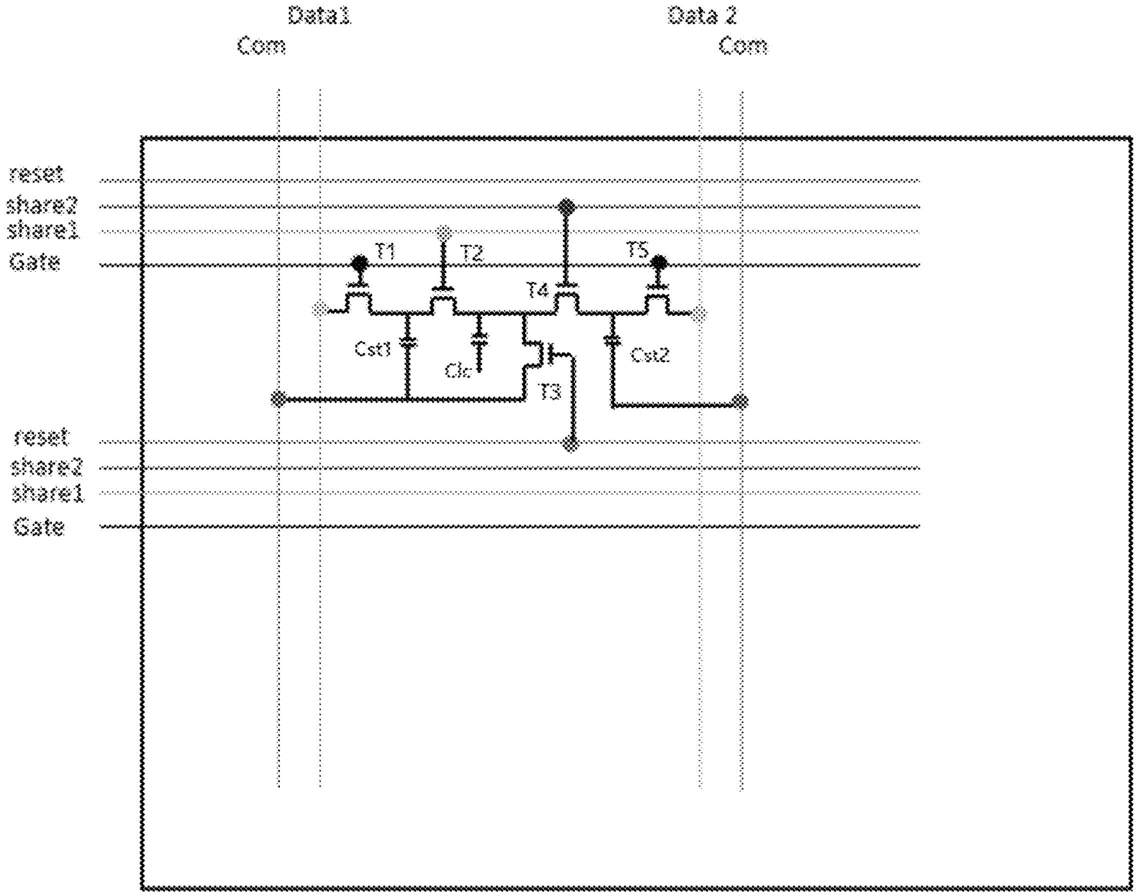
FIG. 6 is a schematic diagram of another drive circuit of a display panel provided by an embodiment of the present application.

The description of reference signs in FIGS. 5 and 6:

T1—first thin film transistor; T2—second thin film transistor; T3—third thin film transistor; T4—fourth thin film transistor; T5—fifth thin film transistor; Cst1—first storage capacitor, Cst2—second storage capacitor; Clc—liquid crystal capacitor; Data1—first source signal; Data2—second source signal; Gate—gate scan signal; Reset—data erasing signal; Share1—first data writing signal; Share2—second data writing signal; Vcom—common electrode of display Panel; CFcom—common electrode of CF substrate.

DETAILED DESCRIPTION OF EMBODIMENTS

In the following description, in order to describe but not intended to limit, concrete details such as specific system structure, technique, and so on are proposed, thereby facilitating comprehensive understanding of the embodiments of the present application. However, it will be apparent to those skilled in the art that, the present application can also be implemented in some other embodiments without these concrete details. In some other conditions, detailed explanations of method, circuit, device and system well known to the public are omitted, so that unnecessary details can be prevented from obstructing the description of the present application.

It is also understood that the term "and/or" as used in the specification of the present application and the accompanying claims refers to and includes any combination of one or more of the associated listed terms and all possible combinations.

In addition, in the description of the specification of the present application and the accompanying claims, the terms "first," "second," "third," etc., are used only to distinguish the description and are not to be understood as indicating or implying relative importance.

References to "one embodiment" or "some embodiments" as described in the specification of the present application, etc., imply the inclusion in one or more embodiments of the present application of specific features, structures or characteristics described in combination with the embodiments. Thus, the words "in one embodiment", "in some embodiments", "in some other embodiments", "in some further embodiments", etc., which appear in differences in the specification, do not necessarily all refer to the same embodiments, but mean "one or more but not all embodiments" unless otherwise specifically emphasized. The terms "including", "containing", "having" and their variations all mean "including but not limited to" unless otherwise specifically emphasized.

Embodiment 1

Embodiment 1 of the present application provides a display device, FIG. 1 shows a structural schematic diagram of the display device 100 of the embodiment. The display device includes a display panel 01, a memory 02, a controller 03, and a computer program stored in the memory 02 that can be run on the controller 03. The controller can be DIC (dual in-line ceramic package) or TCON (timing controller). The drive method of the display device can be executed when the controller of the display device runs the corresponding computer program.

Specifically, the memory 02 and the controller 03 can be connected by a bus or signal line. The display panel 01 can be connected to the communication interface 04 by a bus, a signal line or a circuit board.

The communication interface 04 can be used to connect the I/O (Input/Output) related display panel 01 to the controller 03 and the memory 02. In some embodiments, the controller 03, the memory 02, and the communication interface 04 are integrated on a same chip or a circuit board; in some other embodiments, either or both of the controller 03 and the memory 02 and the communication interface 04 can be implemented on separate chips or circuit boards, which are not limited in the embodiment.

The Display device can be a thin film transistor liquid crystal display (TFT-LCD), a liquid crystal display (LCD), an organic electroluminesence display (OLED), a quantum dot light emitting diodes (QLED) display.

In applications, the display device usually includes a high definition multimedia interface (HDMI), a substrate, a main-board, a timing control board, a source driver, a gate driver, a backlight source component, etc. The substrate includes ta power management integrated circuit (pmic), which is configured for providing operating voltages for the main-board, the timing control board, a data drive board, and a scan drive board, etc., and is further configured for generating a common voltage. The main-board includes a transition-minimized differential signaling (TMDS) receiver, an analog-to-digital converter, a clock generator, a Scaler IC, a microcontroller circuit, and an embedded display interface, etc. The microcontroller circuit usually includes a backlight control chip and a display data memory, etc. The timing control board includes a timing controller (TCON) and a clock and data recovery (CDR) circuit, etc. The source driver includes a data driver unit, and the data driver unit can be a source driver chip (Source Driver IC) or a source-chip on film (S-COF), etc., for sending source signals. The Gate Driver includes a gate driver unit, the gate driver unit can be a gate driver chip (Gate Driver IC) or a gate-chip on film (G-COF), etc., for sending gate scan signals.

The backlight source assembly includes a backlight module, and the backlight module can provide a backlight corresponding to the sub-field sequence for the LCD display panel.

It is understandable that the way to achieve color display of liquid crystal display devices is divided into color filter method and color field sequence display method. In the liquid crystal display device using the color filter method, each pixel unit of the display panel is divided into three sub-pixel units, and provides a color filter for each sub-pixel unit, and the light emitted by the backlight source is transmitted to the red, green and blue color filter through the liquid crystal, and then forms a color image. In the liquid crystal display device using the color field sequence display method, RGB light sources are arranged in each pixel unit, rather than dividing the pixel unit into three RGB sub-pixel units, and in a time-sharing way, the red, green and blue primary colors emitted by the RGB light source are sequentially emitted through the liquid crystal, and the preset angle of time-sharing deflection of the liquid crystal molecules corresponding to the pixel unit is correspondingly controlled to correspond to the gray levels of the R, G and B primary colors, so that the color image is displayed using the afterimage effect.

In the embodiment, the drive mode of the display panel adopts the color field sequence display method.

Since in the sub-field sequences of the conventional color field sequence display method, the pixel driver data corresponding to the color component plots are written into the liquid crystal display panel. After the pixel driver data is written, the liquid crystal in the liquid crystal display panel is driven and moves to the position corresponding to the color component plots. Then the backlight module is controlled to turn on the backlight corresponding to the sub-field sequences to realize the display of the color component plots in the corresponding field sequence. However, the writing process of the pixel driver data will cause the time of the backlight of the display panel being turned on to be shorter, thus the overall display brightness and gamut will be affected. In addition, because the sub-field sequence frequency of the field sequence liquid crystal display is three times the refresh frequency, thus when the color field sequence display mode is applied to the high frequency liquid crystal display, the time of sub-field sequence of a frame is very short, which results in insufficient writing time of pixel driver data.

Figure 2:
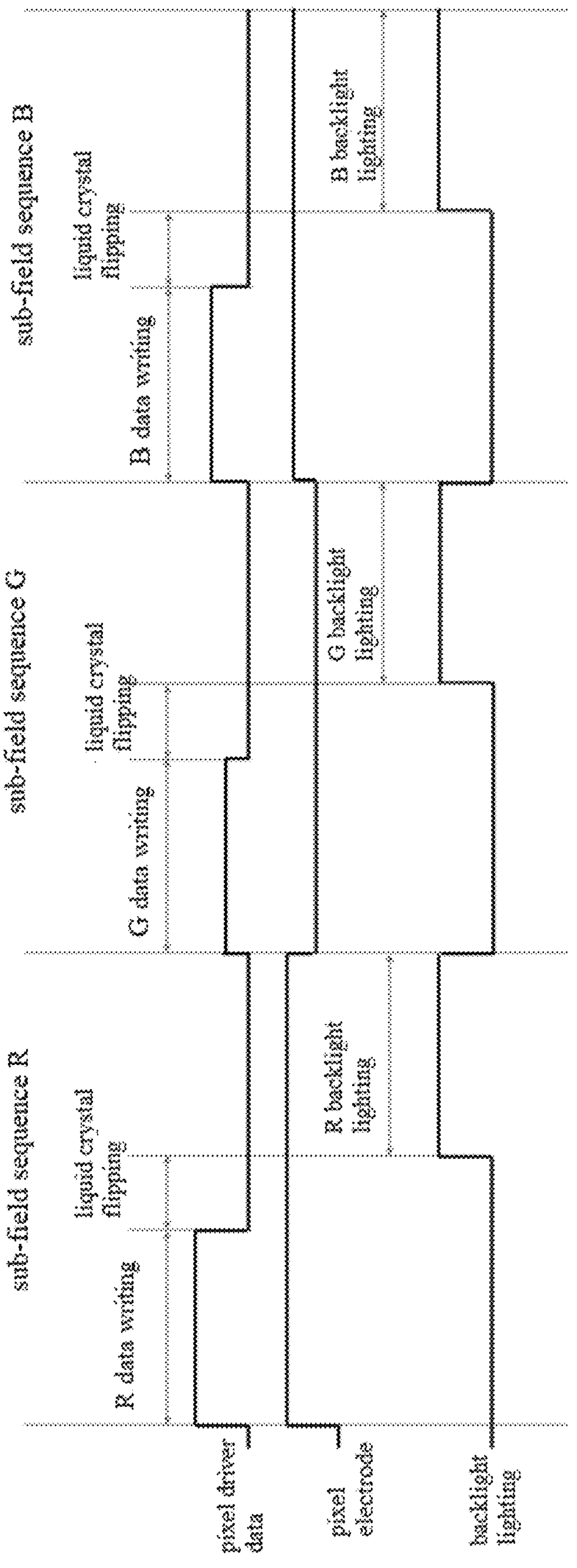
FIG. 2 is a color field sequence display timing diagram of a conventional display panel.

FIG. 2 is a color field sequence display timing diagram of a conventional display panel; and as shown in FIG. 2, a frame of color display is divided into three RGB sub-field sequences, and a completed frame of color display is formed through the superposition of the three sub-field sequences. Each frame of sub-field sequence can be divided into three stages: data writing, liquid crystal flipping, and backlight luminous. However, with the current higher and higher requirements for display resolution, the amount of data writing will gradually become larger, so the time of data written is becoming longer and longer, which compress the time of backlight luminous, and results in the actual duty cycle of the display lighting smaller, thus affecting the realization of high brightness and high color gamut of the display.

When executing the computer program, the controller corresponding to the display device of the present embodiment realizes the steps of the method of temporarily storing the pixel driver data of a sub-field sequence into a storage capacitor in two times, and the time period of each temporary storage into the storage capacitor overlaps the backlight luminescent period of the previous two sub-field sequences of the sub-field sequence, thus the problem of insufficient charging of high frequency liquid crystal display pixel is solved.

Embodiment 2

Figure 3:
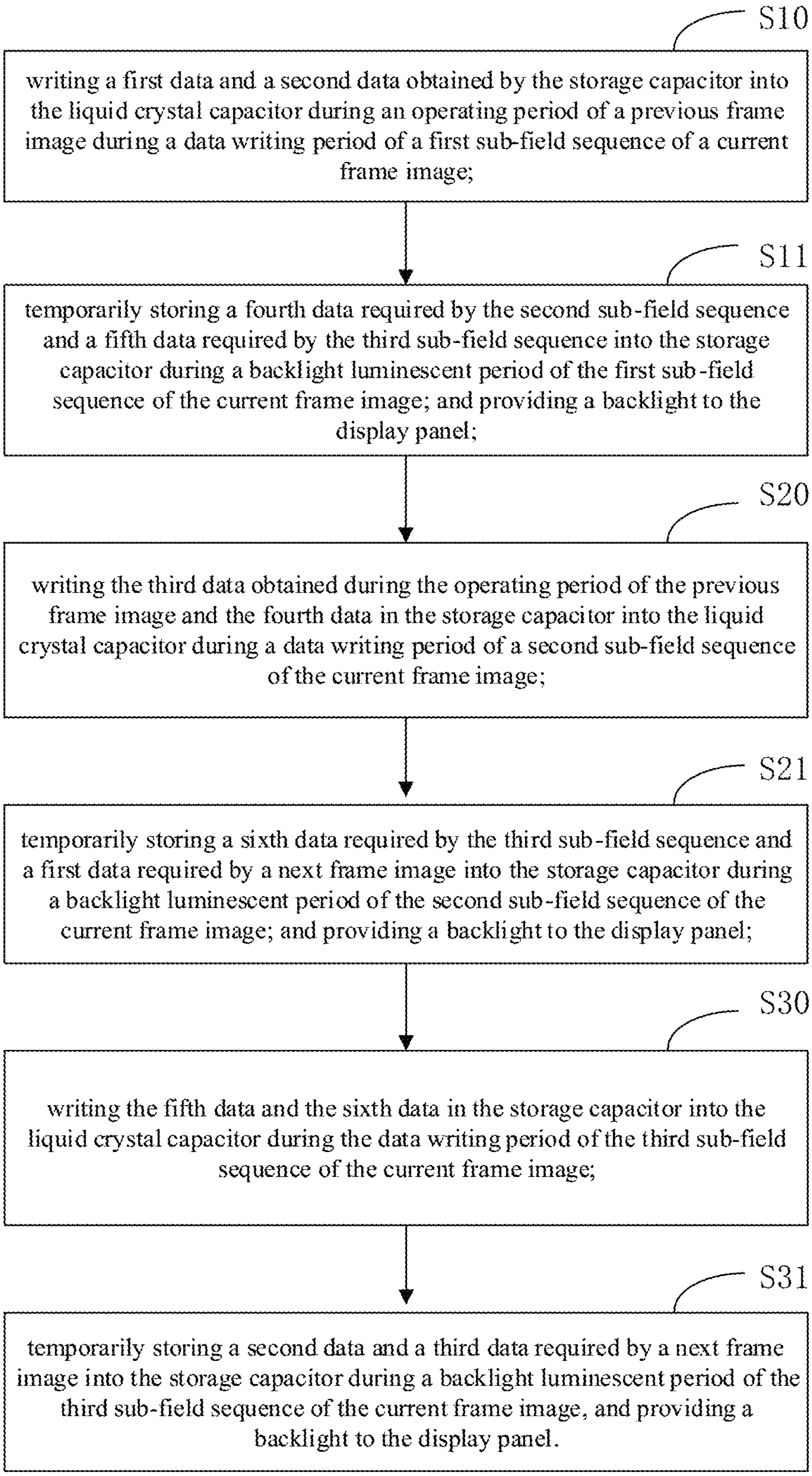
FIG. 3 is a flowchart of a drive method of a display panel provided in Embodiment 2 of the present application.

The embodiment 2 provides a drive method of a display panel, and the main process steps are shown in FIG. 3; the display panel includes a plurality of pixel units, each of the plurality of pixel units corresponds to a storage capacitor and a liquid crystal capacitor; a time required for displaying each frame image through the display panel comprises a first sub-field sequence (sub-field sequence R), a second sub-field sequence (sub-field sequence G), and a third sub-field sequence (sub-field sequence B) in sequence, and each sub-field sequence comprises a data writing period and a backlight luminescent period in sequence; the present embodiment temporarily stores the pixel driver data of a sub-field sequence into a storage capacitor in two times, and the time period of each temporary storage into the storage capacitor overlaps the backlight luminescent period of the previous two sub-field sequences of the sub-field sequence, thus the problem of insufficient charging of high frequency liquid crystal display pixel is solved In the embodiment, a pixel driver data required by the first sub-field sequence is a first display data, and the first display data includes a first data and a second data, which is used for temporarily storing into the storage capacitor in two times; a pixel driver data required by the second sub-field sequence is a second display data, and the second display data includes a third data and a fourth data, which is used for temporarily storing into the storage capacitor in two times; and a pixel driver data required by the third sub-field sequence is a third display data, and the third display data includes a fifth data and a sixth data, which is used for temporarily storing into the storage capacitor in two times.

Figure 4:
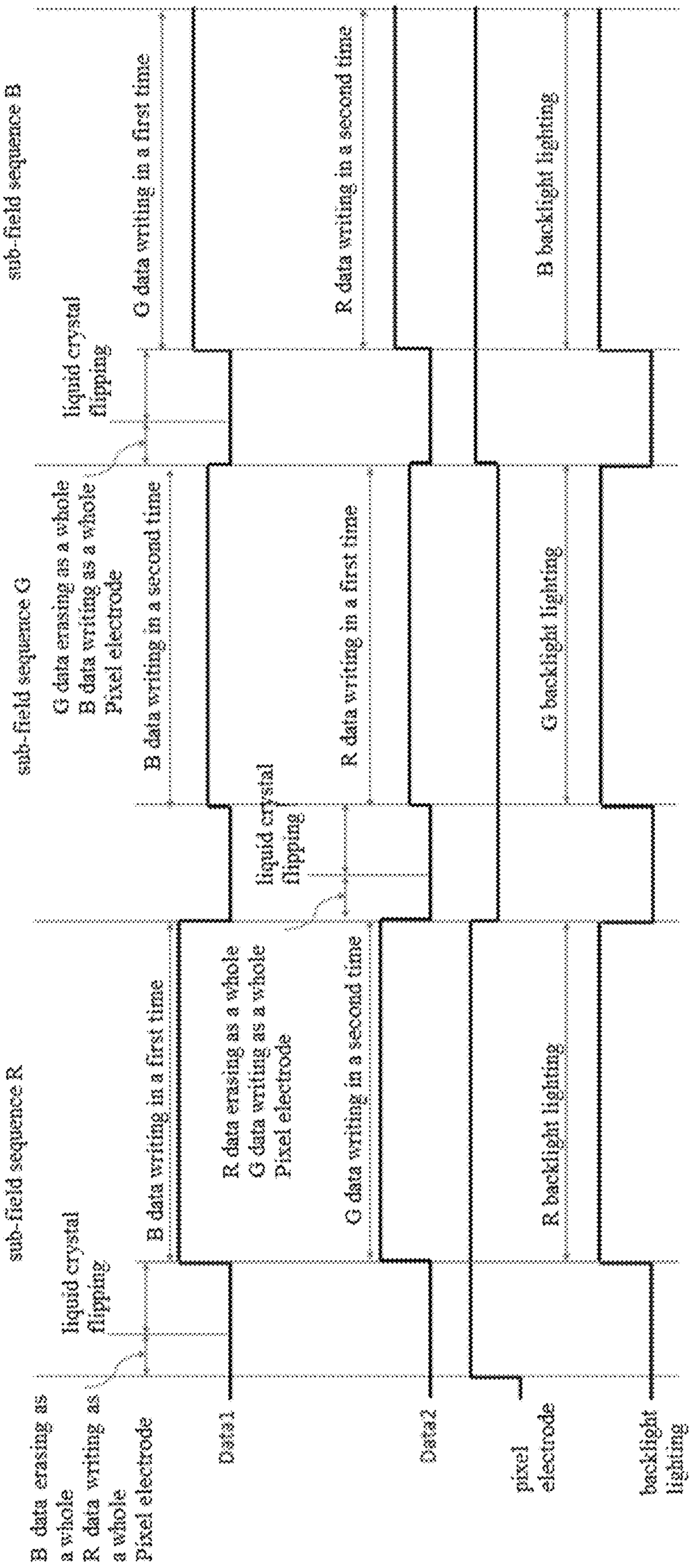
FIG. 4 is a color field sequence display timing diagram of a display panel provided by an embodiment of the present application.

It can be understood that, as shown in FIG. 4, the first display data represents a R pixel driver data, the second display data represents a G pixel driver data, and the third display data represents a B pixel driver data. In the embodiment, the pixel driver data of a sub-field sequence can be temporarily stored into the storage capacitor in two times, the first data indicates that the R pixel driver data needs to be written into the storage capacitor for the first time (corresponding to the "first write of R data" in FIG. 4), and the second data indicates that the R pixel driver data needs to be written into the storage capacitor for the second time (corresponding to the "second write of R data" in FIG. 4); the third data indicates that the G pixel driver data needs to be written into the storage capacitor for the first time (corresponding to the "first write of G data" in FIG. 4), and the fourth data indicates that the G pixel driver data needs to be written into the storage capacitor for the second time (corresponding to the "second write of G data" in FIG. 4; the fifth data indicates that the B pixel driver data needs to be written into the storage capacitor for the first time (corresponding to "the first write of B data" in FIG. 4), and the sixth data indicates that the B pixel driver data needs to be written into the storage capacitor for the second time (corresponding to "the second write of B data" in FIG. 4).

Accordingly, the drive method of the display panel in the embodiment mainly includes the following steps:

In step S10, writing a first data and a second data obtained by the storage capacitor into the liquid crystal capacitor during an operating period of a previous frame image during a data writing period of a first sub-field sequence of a current frame image (corresponding to "R data writing as a whole" in FIG. 4);

In one embodiment, during the data writing period of the first sub-field sequence of the current frame image, the fifth and sixth data required for the previous frame image in the liquid crystal capacitor are erased (corresponding to "B data erasing as a whole" in FIG. 4);

In a specific implementation, the liquid crystal capacitor corresponding to the liquid crystal molecule is driven to flip during the first sub-field sequence of the current frame image, so that the pixel electrode of the pixel unit of the display panel maintains the gray level voltage corresponding to the first display data;

In step S11, temporarily storing a fourth data required by the second sub-field sequence and a fifth data required by the third sub-field sequence into the storage capacitor during a backlight luminescent period of the first sub-field sequence of the current frame image; and providing a backlight to the display panel.

In step S20, writing the third data obtained during the operating period of the previous frame image and the fourth data in the storage capacitor into the liquid crystal capacitor during a data writing period of a second sub-field sequence of the current frame image (corresponding to "B data writing as a whole" in FIG. 4);

In one embodiment, the first data and the second data required for the first sub-field sequence of the current frame image are erased in the liquid crystal capacitor during the data writing period of the second sub-field sequence of the current frame image (corresponding to "R data erasing as a whole" in FIG. 4); the pixel driver data that has been displayed in monochrome image in liquid crystal capacitor can be erased in time to prepare for writing pixel driver data in the next sub-field sequence.

In a specific implementation, the liquid crystal capacitor corresponding to the liquid crystal molecule is driven to flip during the second sub-field sequence of the current frame image, so that the pixel electrode of the pixel unit of the display panel maintains the gray level voltage corresponding to the second display data;

In step S21, temporarily storing a sixth data required by the third sub-field sequence and a first data required by a next frame image into the storage capacitor during a backlight luminescent period of the second sub-field sequence of the current frame image; and providing a backlight to the display panel.

In step S30, writing the fifth data and the sixth data in the storage capacitor into the liquid crystal capacitor during the data writing period of the third sub-field sequence of the current frame image (corresponding to "B data writing as a whole" in FIG. 4);

In one embodiment, the third data and the fourth data required for the second sub-field sequence of the current frame image are erased in the liquid crystal capacitor during the data writing period of the third sub-field sequence of the current frame image (corresponding to "G data erasing as a whole" in FIG. 4);

The liquid crystal capacitor corresponding to the liquid crystal molecule is driven to flip during the third sub-field sequence of the current frame image, so that the pixel electrode of the pixel unit of the display panel maintains the gray level voltage corresponding to the third display data.

In step S31, temporarily storing a second data and a third data required by a next frame image into the storage capacitor during a backlight luminescent period of the third sub-field sequence of the current frame image, and providing a backlight to the display panel.

The beneficial effects of the embodiment are that the pixel driver data of a sub-field sequence is temporarily stored into a storage capacitor in two times, and the time period of each temporary storage into the storage capacitor overlaps the backlight luminescent period of the previous two sub-field sequences of the sub-field sequence, and finally, the pixel driver data written twice in the storage capacitor is written into the liquid crystal capacitor in the sub-field sequence, the data writing time is increased, and the problem of insufficient charging of high frequency liquid crystal display pixel is solved.

In one embodiment, the storage capacitor includes a first storage capacitor and a second storage capacitor;

Accordingly, the step S10 further includes: writing a first data and a second data obtained by the second storage capacitor during the operating period of the previous frame image into the liquid crystal capacitor during the data writing period of the first sub-field sequence of the current frame image;

The step S11 further includes: temporarily storing the fourth data required by the second sub-field sequence into the second storage capacitor, and temporarily storing the fifth data required by the third sub-field sequence into the first storage capacitor during the backlight luminescent period of the first sub-field sequence of the current frame image;

The step S20 further includes: writing the third data obtained by the first storage capacitor during the operating period of the previous frame image into the liquid crystal capacitor, and writing the fourth data in the second storage capacitor into the liquid crystal capacitor during the data writing period of the second sub-field sequence of the current frame image;

The step S21 further includes: temporarily storing the sixth data required by the third sub-field sequence into the first storage capacitor, and temporarily storing the first data required by the next frame image into the second storage capacitor during the backlight luminescent period of the second sub-field sequence of the current frame image.

The step S30 further comprises: writing the fifth data and the sixth data in the first storage capacitor into the liquid crystal capacitor during the data writing period of the third sub-field sequence of the current frame image;

The step S31 further includes: temporarily storing the third data required by the next frame image to the first storage capacitor, and temporarily storing the second data required by the next frame image into the second storage capacitor during the backlight luminescent period of the third sub-field sequence of the current frame image.

In this embodiment, the pixel driver data of a sub-field sequence is temporarily stored twice to different storage capacitors, which can improve the working efficiency of the pixel driver data of the display panel. Finally, part of the pixel driver data of different storage capacitors are respectively written into the liquid crystal capacitor in the sub-field sequence, thus the data writing time is increased.

Embodiment 3

As shown in FIG. 5, a drive circuit of a display panel provided in embodiment 2 of the present application, and FIG. 5 is a circuit design schematic diagram of the pixel unit in the drive circuit provided in the present invention, the storage capacitor of each pixel unit can be specifically divided into the first storage capacitor (Cst1 in FIG. 5) and the second storage capacitor (Cst2 in FIG. 5). The Gate corresponds to the gate scan signal, and the Vcom represents the common electrode of the Panel.

Accordingly, the drive circuit mainly includes:

a liquid crystal capacitor Clc;

a first storage capacitor Cst1;

a second storage capacitor Cst2;

a first thin film transistor T1, and a controlled end of the first thin film transistor T1 is configured to be accessible by a gate scan signal, an input end of the first thin film transistor T1 is connected to a first source signal Data1, and an output end of the first thin film transistor T1 is connected to the first storage capacitor Cst1;

a second thin film transistor T2, and a controlled end of the second thin film transistor T2 is configured to be accessible by a first data writing signal Share1, an input end of the second thin film transistor T2 is connected with the first storage capacitor Cst1, and an output end of the second thin film transistor T2 is connected with the liquid crystal capacitor Clc;

a third thin film transistor T3, and a controlled end of the third thin film transistor T3 is configured to be accessible by a data erasing signal Reset, an input end of the third thin film transistor T3 is connected with the liquid crystal capacitor Clc, and an output end of the third thin film transistor T3 is connected with a common electrode Vcom.

a fourth thin film transistor T4, and a controlled end of the fourth thin film transistor T4 is configured to be accessible by a second data writing signal Share2, an input end of the fourth thin film transistor T4 is connected with the second storage capacitor Cst2, and an output end of the fourth thin film transistor T4 is connected with the liquid crystal capacitor Clc; and a fifth thin film transistor T5, and a controlled end of the fifth thin film transistor T5 is configured to be accessible by the gate scan signal Gate, an input end of the fifth thin film transistor T5 is connected to a second source signal Data2, and an output end of the fifth thin film transistor T5 is connected to the second storage capacitor Cst2.

It is understood that each pixel unit can correspond, in sequence, to the first thin film transistor T1, the second thin film transistor T2, the third thin film transistor T3, the fourth thin film transistor T4, and the fifth thin film transistor T5. The first storage capacitor Cst1 is connected with the first thin film transistor T1 to form a first data temporary storage unit (corresponding to the first source signal Data1); the second storage capacitor Cst2 is connected with the fifth thin film transistor T5 to form a second data temporary storage unit (corresponding to the second source signal Data2); the liquid crystal capacitor Clc is respectively connected with the second thin film transistor T2 and the fourth thin film transistor T4, which respectively forms a first data write unit (corresponding to the first data write signal Share1) and a second data write unit (corresponding to the second data write signal Share2). The data erasing unit (corresponding to the data erasing signal Reset) consists of a third thin film transistor T3.

As shown in FIG. 6, the controller corresponding to the display panel is used to perform the following steps while responding to each signal:

erasing the fifth data and the sixth data required by the previous frame image in the liquid crystal capacitor during the data writing period of the first sub-field sequence of the current frame image;

sending a second data writing signal Share2 to the controlled end of the fourth thin film transistor T4 during a data writing period of the first sub-field sequence of the current frame image, to write a first data and a second data obtained by the second storage capacitor into the liquid crystal capacitor during an operating period of a previous frame image;

sending a gate scan signal Gate to the controlled end of the first thin film transistor T1 during a backlight luminescent period of the first sub-field sequence of the current frame image, to enable the first thin film transistor T1 receiving a first source signal Data1 to determine a fifth data required by the third sub-field sequence, and temporarily store the fifth data required by the third sub-field sequence into the first storage capacitor; sending a gate scan signal Gate to the controlled end of the fifth thin film transistor T5, to enable the fifth thin film transistor T5 receiving a second source signal Data2 to determine a fourth data required by the second sub-field sequence, and temporarily storing the fourth data required by the second sub-field sequence into the second storage capacitor;

erasing the first data and the second data required by the first sub-field sequence of the current frame image in the liquid crystal capacitor during the data writing period of the second sub-field sequence of the current frame image;

sending a first data writing signal Share1 to the controlled end of the second thin film transistor T1 during a data writing period of the second sub-field sequence of the current frame image, to write a third data obtained by the first storage capacitor during the operating period of the previous frame image into the liquid crystal capacitor; and sending a second data writing signal Share2 to the controlled end of the fourth thin film transistor T4 to write the fourth data in the second storage capacitor into the liquid crystal capacitor;

sending the gate scan signal Gate to the controlled end of the first thin film transistor T1 during a backlight luminescent period of the second sub-field sequence of the current frame image, to enable the first thin film transistor T1 receiving the first source signal Data1 to determine a sixth data required by the third sub-field sequence, and temporarily storing the sixth data required by the third sub-field sequence into the first storage capacitor; and sending the gate scan signal Gate to the controlled end of the fifth thin film transistor T5, to enable the fifth thin film transistor T5 receiving the second source signal Data2 to determine a first data required by a next frame image, and temporarily storing the first data required by the next frame image into the second storage capacitor;

erasing the third data and the fourth data required by the first sub-field sequence of the current frame image in the liquid crystal capacitor during the data writing period of the third sub-field sequence of the current frame image;

sending the first data writing signal Share1 to the controlled end of the second thin film transistor T2 during a data writing period of the third sub-field sequence of the current frame image, to write the fifth data and the sixth data in the first storage capacitor into the liquid crystal capacitor;

sending the gate scan signal Gate to the controlled end of the first thin film transistor T1 during a backlight luminescent period of the third sub-field sequence of the current frame image, to enable the first thin film transistor T1 receiving the first source signal Data1 to determine a third data required by the next frame image, and temporarily storing the third data required by the next frame image into the first storage capacitor; and sending the gate scan signal Gate to the controlled end of the fifth thin film transistor T5, to enable the fifth thin film transistor T5 receiving the second source signal Data2 to determine a second data required by the next frame image, and temporarily storing the second data required by the next frame image into the second storage capacitor;

temporarily storing the second data required by the next frame image into the storage capacitor, and providing a backlight to the display panel.

Figure 7:
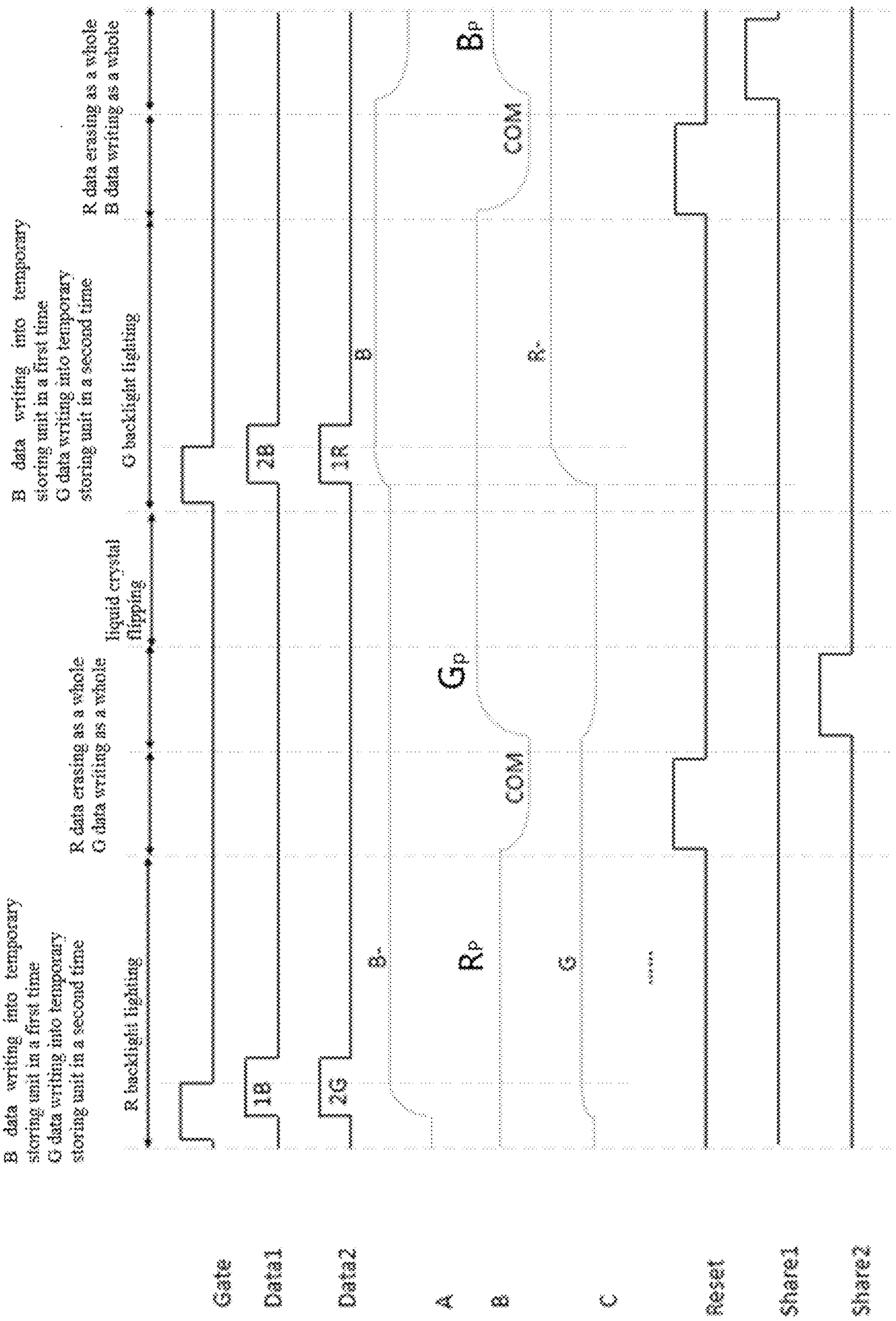
FIG. 7 is a timing diagram of a corresponding circuit in operation provided by an embodiment of the present application when a display device is in operation.

Further, in order to better describe the scheme of the embodiment, as shown in FIG. 7, which is a timing diagram of a corresponding circuit in operation when a display device is in operation, as shown in FIG. 7, it can be seen that the embodiment of the present application the present application temporarily stores the pixel driver data of a sub-field sequence into a storage capacitor in two times, and the time period of each temporary storage into the storage capacitor overlaps the backlight luminescent period of the previous two sub-field sequences of the sub-field sequence, and finally, the pixel driver data written twice in the storage capacitor is written into the liquid crystal capacitor in the sub-field sequence;

Specifically, the work of each sub-field sequence of the circuit is divided into a data temporary storing stage, a data erasing stage, and a data writing stage:

1. In the stage that B data is written into the data temporary storing unit in a first time, and G data is written into the data temporary storing unit in a second time, at this time, the pixel electrode B point is a gray-level voltage Rp of R, and the backlight keeps R red lighting to display the red sub-field image; and at this time, the gate scan signal Gate is at a high potential, the first sub-frame and the second sub-frame in the first source signal Data1 and the second source signal Data2 are respectively sent to the B data and the G data, where the point A and point C respectively reach the B− potential and G potential after being charged, and the point C has reached the target voltage G, while point A only reaches the non-target voltage B− due to the insufficient charge of the first sub-frame; then all rows proceed to this stage in turn;
2. In the stage that the R data at point B are erased as a whole, at this time the data erasing signal Reset is at a high voltage, and the voltage of all pixels of point B changes to a common voltage COM;
3. In the stage that G data at point B are written as a whole, at this time, the second data writing signal Share2 is at a high voltage, so all voltages at the point B is converted into the target voltage Gp at point C in Cst2, while the first data writing signal Share1 is at a low voltage, and the voltage at point A will not be shunt to point B through T2.
4. In the stage that B data is written into the data temporary storing unit in a second time, and R data is written into the data temporary storing unit in a first time, at this time, the pixel electrode B point is a gray-level voltage Rp of G, and the backlight keeps green lighting to display the green sub-field image; and at this time, the gate scan signal Gate is at a high potential, the second sub-frame and the first sub-frame in the first source signal Data1 and the second source signal Data2 are respectively sent to the B data and the R data, where the point A and point C respectively reach the B potential and R− potential after being charged, and the point A has reached the target voltage B, while point C only reaches the non-target voltage R− due to the insufficient charge of the first sub-frame; then all rows proceed to this stage in turn;
5. In the stage that G data at point B are erased as a whole, at this time the data erasing signal Reset is at a high voltage, and the voltage of all pixels of point B changes to a common voltage COM;
6. In the stage that B data at point B are written as a whole, at this time, the first data writing signal Share1 is at a high voltage, so all voltages at the point B is converted into the target voltage Bp at point B in Cst2, while the first data writing signal Share1 is at a low voltage, and the voltage at point A will not be shunt to point B through T2.

In the above embodiments, the description of each embodiment has its own emphasis, and the parts of an embodiment that are not detailed or recorded can be referred to the relevant descriptions of other embodiments.

Those skilled in the art may realize that the units and algorithmic steps of the examples described in conjunction with the embodiments disclosed herein can be implemented in electronic hardware, or in a combination of computer software and electronic hardware. Whether these functions are performed in hardware or software depends on the specific application and design constraints of the technical solution. Technical professionals may use different methods for each particular application to achieve the described functionality, but such implementation should not be considered beyond the scope of the present application.

In the embodiments provided in the present application, it should be understood that the device and the method disclosed can be implemented by other means. For example, the device embodiments described above are only schematic, for example, the division of the unit is only a logical function division, and the actual implementation can have another division, such as multiple units or components can be combined or integrated into another system, or some features can be ignored or not performed. In addition, the coupling or direct coupling or communication connection between each other shown or discussed may be an indirect coupling or communication connection through some interface, device or unit, which can be electrical, mechanical or other form.

The units described as separate parts can or can not be physically separate, and the parts shown as units can or can not be physical units, that is, they can be located in one place, or they can be distributed over multiple network units. Some or all of the units can be selected according to the actual needs to realize the purpose of the embodiment solution.

The above embodiments are used only to illustrate the technical solution of the present application and not to limit the present application. Notwithstanding the detailed description of the present application by reference to the foregoing embodiments, it should be understood by those skilled in the art that they can modify the technical solution recorded in the foregoing embodiments or make equivalent substitutions for some of the technical features; such modification or replacement shall not separate the essence of the corresponding technical solution from the spirit and scope of the technical solution of each embodiment of the present application, and shall be included in the scope of protection of the present application.

What is claimed is:

1. A drive method of a display panel, wherein the display panel comprises a plurality of pixel units, each of the plurality of pixel units corresponds to a storage capacitor and a liquid crystal capacitor; a time required for displaying each frame image through the display panel comprises a first sub-field sequence, a second sub-field sequence, and a third sub-field sequence in sequence, and each sub-field sequence comprises a data writing period and a backlight luminescent period in sequence;

wherein a pixel driver data required by the first sub-field sequence is a first display data, and the first display data comprises a first data and a second data;

wherein a pixel driver data required by the second sub-field sequence is a second display data, and the second display data comprises a third data and a fourth data; and wherein a pixel driver data required by the third sub-field sequence is a third display data, and the third display data comprises a fifth data and a sixth data;

wherein the drive method comprises:

writing a first data and a second data obtained by the storage capacitor into the liquid crystal capacitor during an operating period of a previous frame image during a data writing period of a first sub-field sequence of a current frame image;

temporarily storing a fourth data required by the second sub-field sequence and a fifth data required by the third sub-field sequence into the storage capacitor during a backlight luminescent period of the first sub-field sequence of the current frame image; and providing a backlight to the display panel;

writing the third data obtained during the operating period of the previous frame image and the fourth data in the storage capacitor into the liquid crystal capacitor during a data writing period of a second sub-field sequence of the current frame image;

temporarily storing a sixth data required by the third sub-field sequence and a first data required by a next frame image into the storage capacitor during a backlight luminescent period of the second sub-field sequence of the current frame image; and providing the backlight to the display panel;

writing the fifth data and the sixth data in the storage capacitor into the liquid crystal capacitor during a data writing period of the third sub-field sequence of the current frame image; and temporarily storing a second data and a third data required by the next frame image into the storage capacitor during a backlight luminescent period of the third sub-field sequence of the current frame image, and providing the backlight to the display panel.

2. The drive method according to claim 1, wherein the storage capacitor comprises a first storage capacitor and a second storage capacitor;

said temporarily storing the fourth data required by the second sub-field sequence and the fifth data required by the third sub-field sequence into the storage capacitor during the backlight luminescent period of the first sub-field sequence of the current frame image comprises:

temporarily storing the fourth data required by the second sub-field sequence into the second storage capacitor, and temporarily storing the fifth data required by the third sub-field sequence into the first storage capacitor during the backlight luminescent period of the first sub-field sequence of the current frame image;

said temporarily storing the sixth data required by the third sub-field sequence and the first data required by the next frame image into the storage capacitor during the backlight luminescent period of the second sub-field sequence of the current frame image comprises:

temporarily storing the sixth data required by the third sub-field sequence into the first storage capacitor, and temporarily storing the first data required by the next frame image into the second storage capacitor during the backlight luminescent period of the second sub-field sequence of the current frame image; and said temporarily storing the second data and the third data required by the next frame image into the storage capacitor during the backlight luminescent period of the third sub-field sequence of the current frame image comprises:

temporarily storing the third data required by the next frame image into the first storage capacitor, and temporarily storing the second data required by the next frame image into the second storage capacitor during the backlight luminescent period of the third sub-field sequence of the current frame image.

3. The drive method according to claim 1, wherein said writing the first data and the second data obtained by the storage capacitor during the operating period of the previous frame image into the liquid crystal capacitor during the data writing period of the first sub-field sequence of the current frame image comprises:

writing a first data and a second data obtained by the second storage capacitor during the operating period of the previous frame image into the liquid crystal capacitor during the data writing period of the first sub-field sequence of the current frame image;

said writing the third data obtained during the operating period of the previous frame image and the fourth data in the storage capacitor into the liquid crystal capacitor during the data writing period of the second sub-field sequence of the current frame image comprises:

writing the third data obtained by the first storage capacitor during the operating period of the previous frame image into the liquid crystal capacitor, and writing the fourth data in the second storage capacitor into the liquid crystal capacitor during the data writing period of the second sub-field sequence of the current frame image; and said writing the fifth data and the sixth data in the storage capacitor into the liquid crystal capacitor during the data writing period of the third sub-field sequence of the current frame image comprises:

writing the fifth data and the sixth data in the first storage capacitor into the liquid crystal capacitor during the data writing period of the third sub-field sequence of the current frame image.

4. The drive method according to claim 1, wherein each sub-field sequence further comprises a liquid crystal flipping period, and the liquid crystal flipping period is located between the data writing period and the backlight luminescent period, and the drive method further comprises:

driving a liquid crystal molecule corresponding to the liquid crystal capacitor to flip during the liquid crystal flipping period of the first sub-field sequence of the current frame image, to enable a pixel electrode of a pixel unit of the display panel to be maintained at a gray level voltage corresponding to the first display data;

driving a liquid crystal molecule corresponding to the liquid crystal capacitor to flip during the liquid crystal flipping period of the second sub-field sequence of the current frame image, to enable a pixel electrode of a pixel unit of the display panel to be maintained at a gray level voltage corresponding to the second display data; and driving a liquid crystal molecule corresponding to the liquid crystal capacitor to flip during the liquid crystal flipping period of the third sub-field sequence of the current frame image, to enable a pixel electrode of a pixel unit of the display panel to be maintained at a gray level voltage corresponding to the third display data.

5. The drive method according to claim 1, further comprising:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the first sub-field sequence of the current frame image in the liquid crystal capacitor during the data writing period of the third sub-field sequence of the current frame image.

6. A drive circuit of a display panel, comprising:

a liquid crystal capacitor;

a first storage capacitor;

a second storage capacitor;

a first thin film transistor, wherein a controlled end of the first thin film transistor is configured to be accessible by a gate scan signal, an input end of the first thin film transistor is configured to be accessible by a first source signal, and an output end of the first thin film transistor is connected to the first storage capacitor;

a second thin film transistor, wherein a controlled end of the second thin film transistor is configured to be accessible by a first data writing signal, an input end of the second thin film transistor is connected with the first storage capacitor, and an output end of the second thin film transistor is connected with the liquid crystal capacitor;

a fourth thin film transistor, wherein a controlled end of the fourth thin film transistor is configured to be accessible by a second data writing signal, an input end of the fourth thin film transistor is connected with the second storage capacitor, and an output end of the fourth thin film transistor is connected with the liquid crystal capacitor; and a fifth thin film transistor, wherein a controlled end of the fifth thin film transistor is configured to be accessible by the gate scan signal, an input end of the fifth thin film transistor is connected to a second source signal, and an output end of the fifth thin film transistor is connected to the second storage capacitor.

7. The drive circuit of the display panel according to claim 6, further comprising:

a third thin film transistor, wherein a controlled end of the third thin film transistor is configured to be accessible by a data erasing signal, an input end of the third thin film transistor is connected with the liquid crystal capacitor, and an output end of the third thin film transistor is connected with a common electrode of the display panel.

8. The drive circuit of the display panel according to claim 6, wherein the display panel comprises a plurality of pixel units, each of the plurality of pixel units corresponds to the first thin film transistor, the second thin film transistor, the fourth thin film transistor, and the fifth thin film transistor, respectively;

a time required for displaying each frame image through the display panel comprises a first sub-field sequence, a second sub-field sequence, and a third sub-field sequence in sequence, and each sub-field sequence comprises a data writing period and a backlight luminescent period in sequence; wherein a pixel driver data required by the first sub-field sequence is a first display data, and the first display data comprises a first data and a second data; a pixel driver data required by the second sub-field sequence is a second display data, and the second display data comprises a third data and a fourth data; and a pixel driver data required by the third sub-field sequence is a third display data, and the third display data comprises a fifth data and a sixth data;

wherein a controller corresponding to the display panel is configured for:

sending a second data writing signal to the controlled end of the fourth thin film transistor during a data writing period of the first sub-field sequence of the current frame image, to write the first data and the second data obtained by the second storage capacitor into the liquid crystal capacitor during an operating period of a previous frame image;

sending the gate scan signal to the controlled end of the first thin film transistor during a backlight luminescent period of the first sub-field sequence of the current frame image, to enable the first thin film transistor receiving the first source signal to determine the fifth data required by the third sub-field sequence, and to temporarily store the fifth data required by the third sub-field sequence into the first storage capacitor; sending the gate scan signal to the controlled end of the fifth thin film transistor, to enable the fifth thin film transistor receiving a second source signal to determine a fourth data required by the second sub-field sequence, and temporarily storing the fourth data required by the second sub-field sequence into the second storage capacitor;

sending a first data writing signal to the controlled end of the second thin film transistor during a data writing period of the second sub-field sequence of the current frame image, to write a third data obtained by the first storage capacitor during the operating period of the previous frame image into the liquid crystal capacitor; and sending a second data writing signal to the controlled end of the fourth thin film transistor to write the fourth data in the second storage capacitor into the liquid crystal capacitor;

sending the gate scan signal to the controlled end of the first thin film transistor during a backlight luminescent period of the second sub-field sequence of the current frame image, to enable the first thin film transistor receiving the first source signal to determine a sixth data required by the third sub-field sequence, and temporarily storing the sixth data required by the third sub-field sequence into the first storage capacitor; and sending the gate scan signal to the controlled end of the fifth thin film transistor, to enable the fifth thin film transistor receiving the second source signal to determine a first data required by a next frame image, and temporarily storing the first data required by the next frame image into the second storage capacitor;

sending the first data writing signal to the controlled end of the second thin film transistor during a data writing period of the third sub-field sequence of the current frame image, to write the fifth data and the sixth data in the first storage capacitor into the liquid crystal capacitor;

sending the gate scan signal to the controlled end of the first thin film transistor during a backlight luminescent period of the third sub-field sequence of the current frame image, to enable the first thin film transistor receiving the first source signal to determine a third data required by the next frame image, and temporarily storing the third data required by the next frame image to the first storage capacitor; and sending the gate scan signal to the controlled end of the fifth thin film transistor, to enable the fifth thin film transistor receiving the second source signal to determine a second data required by the next frame image, and to temporarily store the second data required by the next frame image into the second storage capacitor; and temporarily storing the second data required by the next frame image into the storage capacitor, and providing a backlight to the display panel.

9. The drive circuit of the display panel according to claim 7, wherein the display panel comprises a plurality of pixel units, each of the plurality of pixel units corresponds to the first thin film transistor, the second thin film transistor, the fourth thin film transistor, and the fifth thin film transistor, respectively;

a time required for displaying each frame image through the display panel comprises a first sub-field sequence, a second sub-field sequence, and a third sub-field sequence in sequence, and each sub-field sequence comprises a data writing period and a backlight luminescent period in sequence; wherein a pixel driver data required by the first sub-field sequence is a first display data, and the first display data comprises a first data and a second data; a pixel driver data required by the second sub-field sequence is a second display data, and the second display data comprises a third data and a fourth data; and a pixel driver data required by the third sub-field sequence is a third display data, and the third display data comprises a fifth data and a sixth data;

wherein a controller corresponding to the display panel is configured for:

sending a second data writing signal to the controlled end of the fourth thin film transistor during a data writing period of the first sub-field sequence of the current frame image, to write the first data and the second data obtained by the second storage capacitor into the liquid crystal capacitor during an operating period of a previous frame image;

sending the gate scan signal to the controlled end of the first thin film transistor during a backlight luminescent period of the first sub-field sequence of the current frame image, to enable the first thin film transistor receiving the first source signal to determine the fifth data required by the third sub-field sequence, and to temporarily store the fifth data required by the third sub-field sequence into the first storage capacitor; sending the gate scan signal to the controlled end of the fifth thin film transistor, to enable the fifth thin film transistor receiving a second source signal to determine a fourth data required by the second sub-field sequence, and temporarily storing the fourth data required by the second sub-field sequence into the second storage capacitor;

sending a first data writing signal to the controlled end of the second thin film transistor during a data writing period of the second sub-field sequence of the current frame image, to write a third data obtained by the first storage capacitor during the operating period of the previous frame image into the liquid crystal capacitor; and sending a second data writing signal to the controlled end of the fourth thin film transistor to write the fourth data in the second storage capacitor into the liquid crystal capacitor;

sending the gate scan signal to the controlled end of the first thin film transistor during a backlight luminescent period of the second sub-field sequence of the current frame image, to enable the first thin film transistor receiving the first source signal to determine a sixth data required by the third sub-field sequence, and temporarily storing the sixth data required by the third sub-field sequence into the first storage capacitor; and sending the gate scan signal to the controlled end of the fifth thin film transistor, to enable the fifth thin film transistor receiving the second source signal to determine a first data required by a next frame image, and temporarily storing the first data required by the next frame image into the second storage capacitor;

sending the first data writing signal to the controlled end of the second thin film transistor during a data writing period of the third sub-field sequence of the current frame image, to write the fifth data and the sixth data in the first storage capacitor into the liquid crystal capacitor;

sending the gate scan signal to the controlled end of the first thin film transistor during a backlight luminescent period of the third sub-field sequence of the current frame image, to enable the first thin film transistor receiving the first source signal to determine a third data required by the next frame image, and temporarily storing the third data required by the next frame image to the first storage capacitor; and sending the gate scan signal to the controlled end of the fifth thin film transistor, to enable the fifth thin film transistor receiving the second source signal to determine a second data required by the next frame image, and to temporarily store the second data required by the next frame image into the second storage capacitor; and temporarily storing the second data required by the next frame image into the storage capacitor, and providing a backlight to the display panel.

10. The drive circuit of the display panel according to claim 8, wherein each pixel unit is further corresponding to the third thin film transistor; and the controller corresponding to the display panel is further configured for:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the second sub-field sequence of the current frame image in the liquid crystal capacitor during the data writing period of the third sub-field sequence of the current frame image.

11. The drive circuit of the display panel according to claim 9, wherein each pixel unit is further corresponding to the third thin film transistor; and the controller corresponding to the display panel is further configured for:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the second sub-field sequence of the current frame image in the liquid crystal capacitor during the data writing period of the third sub-field sequence of the current frame image.

12. A display device, comprising a display panel and a controller; the controller is configured to control the display panel to display based on a drive method of a display panel, wherein the display panel comprises a plurality of pixel units, each of the plurality of pixel units corresponds to a storage capacitor and a liquid crystal capacitor; a time required for displaying each frame image through the display panel comprises a first sub-field sequence, a second sub-field sequence, and a third sub-field sequence in sequence, and each sub-field sequence comprises a data writing period and a backlight luminescent period in sequence;

wherein a pixel driver data required by the first sub-field sequence is a first display data, and the first display data comprises a first data and a second data;

wherein a pixel driver data required by the second sub-field sequence is a second display data, and the second display data comprises a third data and a fourth data; and wherein a pixel driver data required by the third sub-field sequence is a third display data, and the third display data comprises a fifth data and a sixth data;

wherein the drive method comprises:

writing a first data and a second data obtained by the storage capacitor into the liquid crystal capacitor during an operating period of a previous frame image during a data writing period of a first sub-field sequence of a current frame image;

temporarily storing a fourth data required by the second sub-field sequence and a fifth data required by the third sub-field sequence into the storage capacitor during a backlight luminescent period of the first sub-field sequence of the current frame image; and providing a backlight to the display panel;

writing the third data obtained during the operating period of the previous frame image and the fourth data in the storage capacitor into the liquid crystal capacitor during a data writing period of a second sub-field sequence of the current frame image;

temporarily storing a sixth data required by the third sub-field sequence and a first data required by a next frame image into the storage capacitor during a backlight luminescent period of the second sub-field sequence of the current frame image; and providing the backlight to the display panel;

writing the fifth data and the sixth data in the storage capacitor into the liquid crystal capacitor during a data writing period of the third sub-field sequence of the current frame image; and temporarily storing a second data and a third data required by the next frame image into the storage capacitor during a backlight luminescent period of the third sub-field sequence of the current frame image, and providing the backlight to the display panel.

13. The display device according to claim 12, wherein the storage capacitor comprises a first storage capacitor and a second storage capacitor;

said temporarily storing the fourth data required by the second sub-field sequence and the fifth data required by the third sub-field sequence into the storage capacitor during the backlight luminescent period of the first sub-field sequence of the current frame image comprises:

temporarily storing the fourth data required by the second sub-field sequence into the second storage capacitor, and temporarily storing the fifth data required by the third sub-field sequence into the first storage capacitor during the backlight luminescent period of the first sub-field sequence of the current frame image;

said temporarily storing the sixth data required by the third sub-field sequence and the first data required by the next frame image into the storage capacitor during the backlight luminescent period of the second sub-field sequence of the current frame image comprises:

temporarily storing the sixth data required by the third sub-field sequence into the first storage capacitor, and temporarily storing the first data required by the next frame image into the second storage capacitor during the backlight luminescent period of the second sub-field sequence of the current frame image; and said temporarily storing the second data and the third data required by the next frame image into the storage capacitor during the backlight luminescent period of the third sub-field sequence of the current frame image comprises:

temporarily storing the third data required by the next frame image into the first storage capacitor, and temporarily storing the second data required by the next frame image into the second storage capacitor during the backlight luminescent period of the third sub-field sequence of the current frame image.

14. The display device according to claim 12, wherein said writing the first data and the second data obtained by the storage capacitor during the operating period of the previous frame image into the liquid crystal capacitor during the data writing period of the first sub-field sequence of the current frame image comprises:

writing a first data and a second data obtained by the second storage capacitor during the operating period of the previous frame image into the liquid crystal capacitor during the data writing period of the first sub-field sequence of the current frame image;

said writing the third data obtained during the operating period of the previous frame image and the fourth data in the storage capacitor into the liquid crystal capacitor during the data writing period of the second sub-field sequence of the current frame image comprises:

writing the third data obtained by the first storage capacitor during the operating period of the previous frame image into the liquid crystal capacitor, and writing the fourth data in the second storage capacitor into the liquid crystal capacitor during the data writing period of the second sub-field sequence of the current frame image; and said writing the fifth data and the sixth data in the storage capacitor into the liquid crystal capacitor during the data writing period of the third sub-field sequence of the current frame image comprises:

writing the fifth data and the sixth data in the first storage capacitor into the liquid crystal capacitor during the data writing period of the third sub-field sequence of the current frame image.

15. The display device according to claim 12, wherein each sub-field sequence further comprises a liquid crystal flipping period, and the liquid crystal flipping period is located between the data writing period and the backlight luminescent period, and the drive method further comprises:

driving a liquid crystal molecule corresponding to the liquid crystal capacitor to flip during the liquid crystal flipping period of the first sub-field sequence of the current frame image, to enable a pixel electrode of a pixel unit of the display panel to be maintained at a gray level voltage corresponding to the first display data;

driving a liquid crystal molecule corresponding to the liquid crystal capacitor to flip during the liquid crystal flipping period of the second sub-field sequence of the current frame image, to enable a pixel electrode of a pixel unit of the display panel to be maintained at a gray level voltage corresponding to the second display data; and driving a liquid crystal molecule corresponding to the liquid crystal capacitor to flip during the liquid crystal flipping period of the third sub-field sequence of the current frame image, to enable a pixel electrode of a pixel unit of the display panel to be maintained at a gray level voltage corresponding to the third display data.

16. The display device according to claim 12, further comprising:

erasing the fifth data and the sixth data required by the previous frame image in the liquid crystal capacitor during the data writing period of the first sub-field sequence of the current frame image;

erasing the first data and the second data required by the first sub-field sequence of the current frame image in the liquid crystal capacitor during the data writing period of the second sub-field sequence of the current frame image; and erasing the third data and the fourth data required by the first sub-field sequence of the current frame image in the liquid crystal capacitor during the data writing period of the third sub-field sequence of the current frame image.

* * * * *